June 29, 1937.  J. D. SCOVILLE  2,085,233
HYDRAULIC TURBINE
Filed Oct. 24, 1936  2 Sheets—Sheet 1

INVENTOR
J. D. SCOVILLE
BY
ATTORNEY

June 29, 1937.  J. D. SCOVILLE  2,085,233
HYDRAULIC TURBINE
Filed Oct. 24, 1936  2 Sheets—Sheet 2

INVENTOR
J. D. SCOVILLE
BY
ATTORNEY

Patented June 29, 1937

2,085,233

UNITED STATES PATENT OFFICE 2,085,233

HYDRAULIC TURBINE

James D. Scoville, York, Pa., assignor to S. Morgan Smith Company, York, Pa., a corporation of Pennsylvania Application October 24, 1936, Serial No. 107,381

1 Claim. (Cl. 253—122)

This invention relates to hydraulic turbines and particularly to the construction of the speed rings of hydraulic turbines of the open flume type.

An object of the invention is to provide an improved speed ring for hydraulic turbines, in which the movable wicket gates for controlling the flow of water to the runner and the stationary guide vanes are arranged around the runner in a common annular series.

Another object of the invention is to provide an improved speed ring for hydraulic turbines, in which the wicket gates and guide vanes are disposed around the runner in such a manner that only one half the usual number of wicket gates and guide vanes are necessary for controlling the flow of water to the runner.

With the foregoing and other objects and advantages in view, the invention consists in the preferred construction and arrangement of the several parts which will be hereinafter more fully described and claimed.

In the accompanying drawings:—

Figure 1:
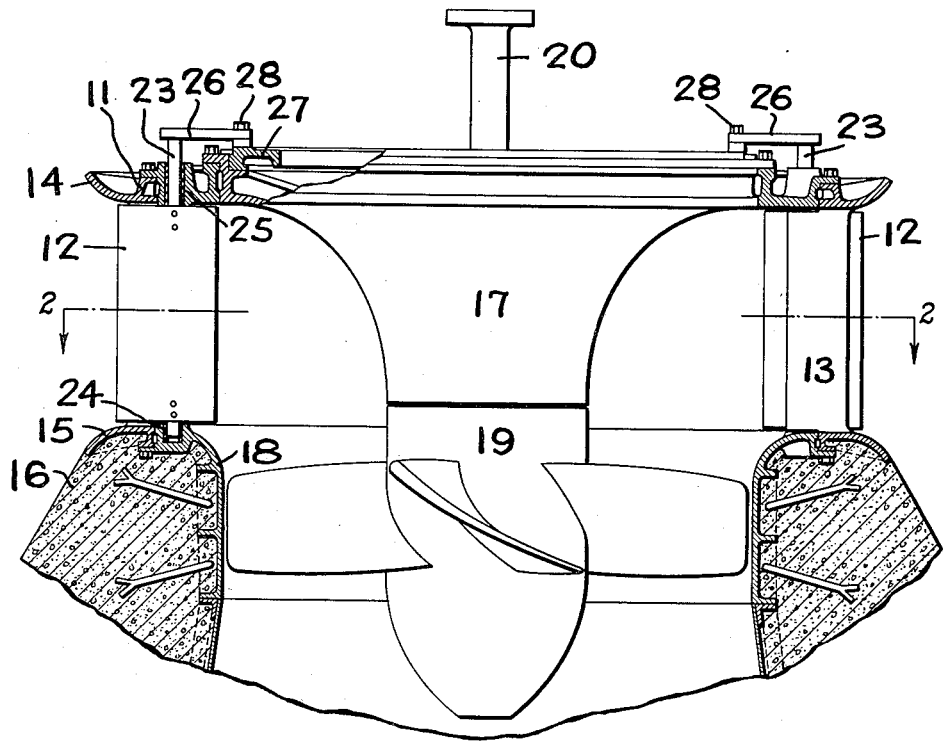
Figure 1 is an elevation, partly in section of a hydraulic turbine installation embodying the present invention.

Referring to the drawings, the type of turbine shown in the illustrated embodiment of the invention comprises a speed ring 11, in which are mounted an annular series of wicket gates 12 and guide vanes 13.

The speed ring 11 is composed of an upper flange 14 and a lower flange 15, which flanges are rigidly held in spaced relation relatively to each other by the guide vanes 13.

The turbine may be mounted in an open flume with the lower flange 15 of the speed ring 11 set in a concrete setting 16.

The upper portion of the turbine is closed by an annular crown or top plate 17 which is disposed within the speed ring 11.

Mounted in the concrete setting 16 and constituting a downward extension of the speed ring 11 is a throat ring 18 which forms an axially directed chamber in which the runner 19 operates.

Figure 2:
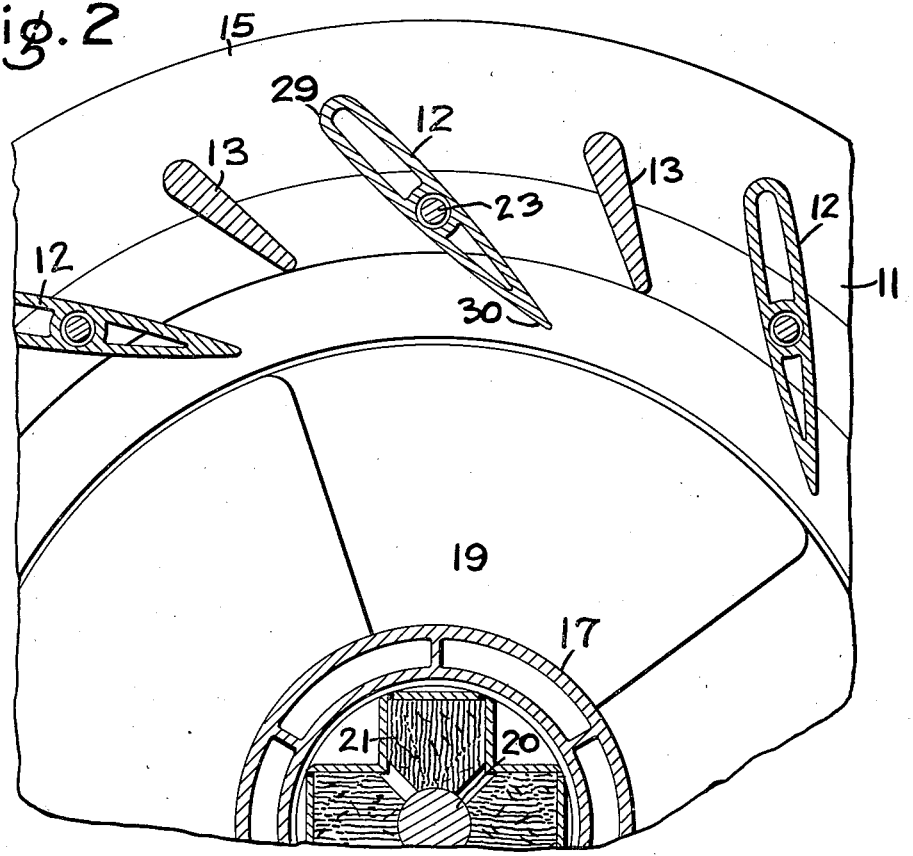
Fig. 2 is a fragmentary horizontal section taken on the line 2—2 of Fig. 1, showing the wicket gates in open position.

The hub of the runner 19 is fixed to the lower end of a shaft 20 which is journalled in a suitable bearing 21 mounted in the crown plate 17, as shown in Fig. 2.

According to the present invention the wicket gates 12 and guide vanes 13 are arranged alternately around the runner 19 in a common annular series.

Heretofore in the construction of hydraulic turbines of the type herein described, it was the practice to arrange the guide vanes in an annular series around the inner annular series of wicket gates. In such an arrangement of the guide vanes and wicket gates it required ten or more guide vanes and a corresponding number of wicket gates in order to completely enclose or surround the runner.

According to the present invention, since a single annular series of alternately disposed guide vanes 13 and wicket gates 12 are employed, obviously the number of such elements required to completely surround the runner is reduced to approximately one half the number of corresponding elements heretofore required. Therefore, the cost of constructing the speed ring in accordance with the present invention is considerably lower than the cost of constructing the usual type of speed ring.

The wicket gates 12 are adapted to be rotated simultaneously into different angular positions to control the flow of water into the turbine.

Each wicket gate is pivotally mounted in the speed ring 11 by means of a shaft or stem 23 which extends through the wicket gate. The lower end of the shaft 23 is mounted in a bearing 24 in the flange 15, and the upper end of said shaft projects upwardly through a bearing or bushing 25 mounted in the flange 14.

The upper end of each shaft 23 is provided with a gate operating arm 26 which is fixed to said shaft. The arms 26 are connected to a gate adjusting ring 27, as indicated at 28, Fig. 1. The gate adjusting ring is adapted to be operated in a well known manner so as to simultaneously rotate the wicket gates.

In operation, when the wicket gates 12 are in open position, as shown in Fig. 2, water will flow in the spaces between the alternately disposed wicket gates 12 and guide vanes 13 towards the runner 19, and consequently the runner will be operated in the usual manner.

Figure 3:
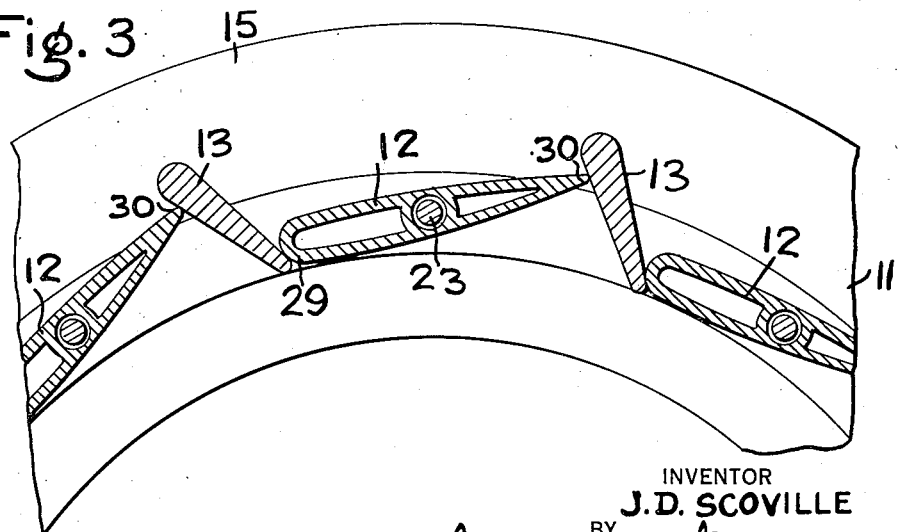
Fig. 3 is a detail section of a portion of the structure shown in Fig. 2, showing the wicket gates in closed position.

As is customary, each wicket gate 12 has a leading or front edge portion 29 and a rear or trailing edge 30. The length of each wicket gate, that is, the distance from the front to the rear edge thereof is such that when the wicket gate is rotated towards closed position, its front edge portion 29 will contact or engage with the rear portion of the adjacent guide vane 13 on one side of the wicket gate and the rear portion 30 of the wicket gate will engage the outer or front portion of the adjacent guide vane 13 on the opposite side of the wicket gates, as shown in Fig. 3. In this way the wicket gates and guide vanes together, cooperate to provide a gate or similar means for controlling the flow of water to the turbine, in lieu of the prior practice in which only the wicket gates functioned to control the amount of water flowing through the speed ring.

While I have herein shown and described one preferred form of my invention by way of illustration, I wish it to be understood that I do not limit or confine myself to the precise details of construction herein described and delineated, as modification and variation may be made within the scope of the claim without departing from the spirit of the invention.

Having thus described my invention, what I claim is:—

In a hydraulic turbine, a speed ring comprising an upper flange and a lower flange, guide vanes extending between said flanges for rigidly retaining said flanges in spaced relation to each other, the lower flange being set in a concrete setting, a crown plate disposed within the speed ring, a throat ring also mounted in said concrete setting and constituting a downward extension of the speed ring, a runner having a plurality of radially projecting blades disposed within said throat ring, a shaft connected to said runner and extending upwardly through said crown plate, a bearing for said shaft mounted in said crown plate, said crown plate having an upper outer peripheral flanged portion mounted on the inner peripheral edge of the upper flange of said speed ring and an inner central depending portion terminating adjacent the top of the hub of the runner and having a diameter equal substantially to the diameter of the hub of the runner, a plurality of rotatable wicket gates arranged alternately with respect to said guide vanes around said speed ring, a stem extending vertically through each wicket gate, a bearing formed in the lower flange of the speed ring for the lower end of said stem, a bearing formed in the upper flange of the speed ring for the upper projecting portion of said stem, a gate operating arm fixed to the upper end of each stem, a gate adjusting ring rotatably mounted within the upper outer peripheral flanged portion of said crown plate, and means pivotally connecting each gate operating arm with said gate adjusting ring whereby the wicket gates may be turned by the arms from said ring.

JAMES D. SCOVILLE.